United States Patent [19]

Jo et al.

[11] Patent Number: 5,883,305

[45] Date of Patent: Mar. 16, 1999

[54] TIRE PRESSURE MONITORING SYSTEM

[75] Inventors: Sung Jin Jo, Gilbert, Ariz.; Chee Seong Chua, Singapore, Singapore

[73] Assignee: Motorola, Inc., Schaumburg, Ill.

[21] Appl. No.: 920,658

[22] Filed: Aug. 29, 1997

[30] Foreign Application Priority Data

Sep. 27, 1996 [SG] Singapore ........................... 9610743-8

[51] Int. Cl.⁶ .................................................. B60C 23/02
[52] U.S. Cl. ............................................................ 73/146.5
[58] Field of Search .............................. 73/146.2, 146.5, 73/146.8; 340/443, 445, 447, 448; 374/143

[56] References Cited

U.S. PATENT DOCUMENTS 5,235,850   8/1993   Schurmann ........................... 73/146.5

OTHER PUBLICATIONS

"Sensor Continuously Monitors Tire Pressure", Mark A. Gottschalk, Design News, Oct. 9, 1995, p. 59.

*Primary Examiner*—William Oen
*Attorney, Agent, or Firm*—Rennie William Dover

[57] ABSTRACT

Remote energy transmitting circuits 30, 35, 36, 37 sequentially transmit a first RF signal when activated by the controller 60. A remote unit 14 in the tire receives the first RF signal, and when the pressure in the tire is greater than a predetermined pressure, the remote unit 14 transmits a second RF signal. Via the remote receiver 20, the controller 60 determines whether the second RF signal is received within a predetermined time after transmitting the first RF signal. When the second RF signal is not received within the predetermined time, the controller 60 assumes a pressure detection failure and causes a display to indicate this condition.

7 Claims, 4 Drawing Sheets

TIRE PRESSURE MONITORING SYSTEM

FIELD OF THE INVENTION

This invention relates to a tire pressure monitoring system and to an apparatus for a driver of a motor vehicle to remotely monitor the fluid pressure of tires on the motor vehicle.

BACKGROUND OF THE INVENTION

A traditional measurement that is necessary for safe operation of a motor vehicle is tire pressure. With the use of electronics it is possible to measure the pressure of each tire and provide continuous monitoring of the pressure to a driver of the vehicle.

Such a system generally includes a controller mounted on the motor vehicle and remote circuitry located in each tire for detecting the tire pressure, and transmitting the detected tire pressure to the controller. The controller receives the detected tire pressure and presents it to the driver.

As will be appreciated, providing power for, and communicating with, the remote circuitry in each tire of the vehicle can present considerable difficulty.

A known method of accomplishing this is to have a battery located in each tire to provide power for the remote circuitry, and to have a radio transmitter for transmitting the detected tire pressure using a radio frequency signal. This method was developed by Epic Technologies and disclosed on page 59 of an article in Engineering News published on Oct. 9, 1995. However, with this method replacement of the batteries is inconvenient, and in addition because of the high temperature and humidity in which the battery has to operate, the efficiency of the battery is adversely affected.

Another known method is to have a transponder mounted in each tire. An on-board antenna mounted on the vehicle body, close to each tire, radiates a radio frequency (RF) signal which provides sufficient power to the transponder for it to transmit an encoded signal. The encoded signal is received by an on-board controller and decoded. The decoded information identifies which tire on the vehicle transmitted the decoded signal, and indicates the detected, tire pressure in that tire. This method is disclosed in U.S. Pat. No. 5,235,850 assigned to Texas Instruments Inc.

While this method overcomes the disadvantages of using a battery, a disadvantage of this method is that the transponder requires complex circuitry to encode identification information and tire pressure data prior to transmission of the encoded signal. Consequently, due to the complexity of the circuitry required in each tire this method is expensive to implement.

In addition, dependent on the strength of the RF signal transmitted by the on-board antenna and the distance between the on-board antenna and the transponder in a tire, the power provided to the transponder will vary. Consequently, the strength of the signal transmitted by the transponder can also vary, which can affect the reliability of the operation of the transponder.

When the vehicle is in motion, the rotating transponder in the tire can come within range of the on-board antenna for sufficient periods to have reliable transponder operation. However, when the vehicle is stationary, dependent on the stationary position of the transponder in the tire, the variations in signal strength could cause unreliable transponder operation. This in turn leads to unreliable tire pressure detection.

BRIEF DESCRIPTION OF THE DRAWINGS

The Invention will now be more fully described, by way of example, with reference to the drawings, of which.

DETAILED DESCRIPTION OF THE DRAWINGS

Figure 1:
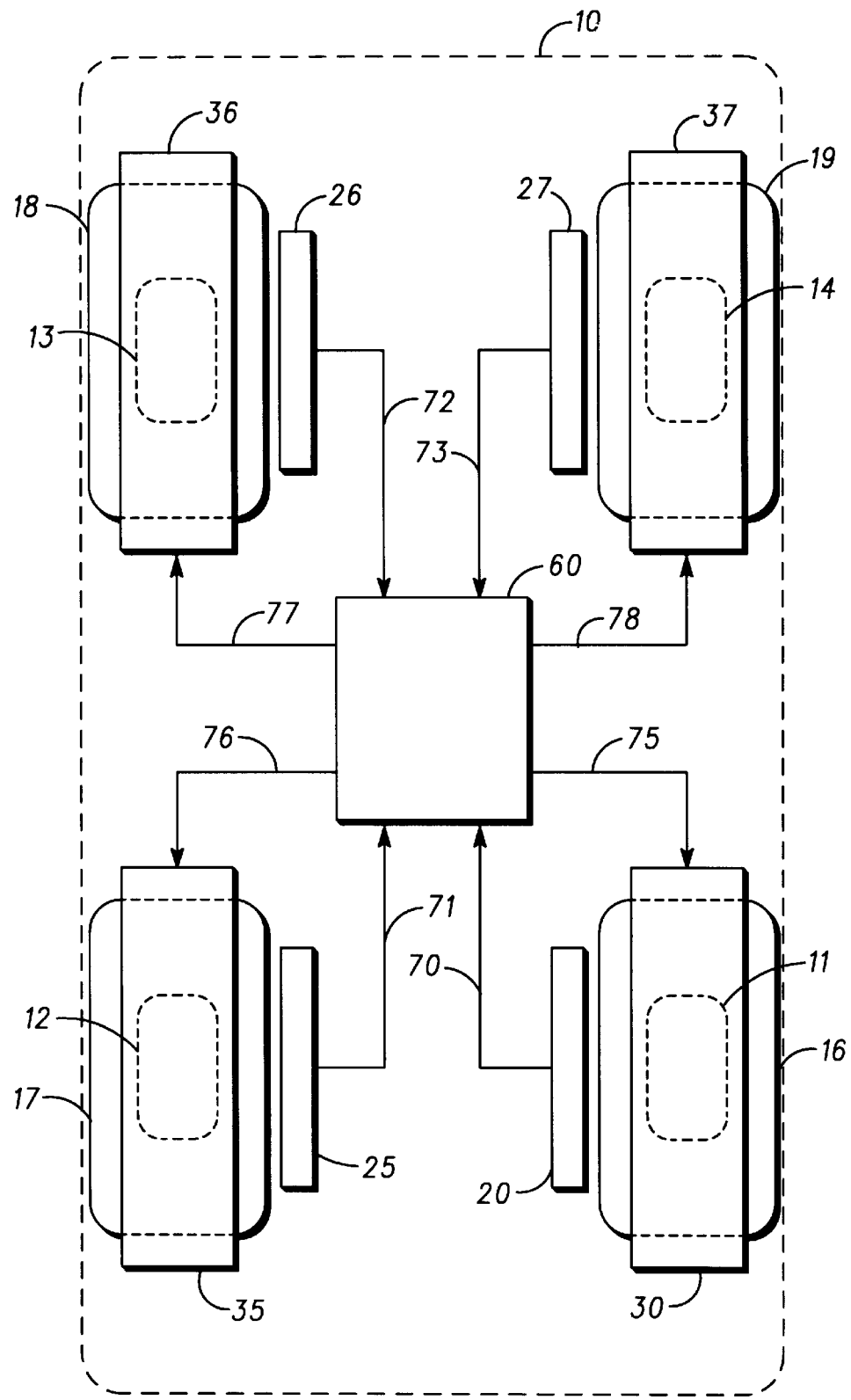
FIG. 1 schematically shows a tire pressure monitoring system according to one embodiment of the invention mounted in a vehicle.

FIG. 1 illustrates a controller 60 mounted on the car body 10 having outputs 75–78, each coupled to remote energy transmitting circuits 30, 35, 36 and 37 respectively. The remote energy transmitting circuits 30, 35, 36 and 37 are each mounted on the vehicle 10 at the location of each tire 16–19 of the vehicle. The controller 60 also has inputs 70–73, each coupled to remote receivers 20,25,26 and 27, respectively. The remote receivers 20,25,26 and 27 are each mounted on the vehicle 10 at the location of each tire 16–19 of the vehicle.

Mounted in each tire 16,17, 18 and 19 of the vehicle 10 is a remote unit 11, 12, 13 and 14. Each of the remote energy transmitting circuits 30, 35, 36 and 37 is associated with one of the remote units 11, 12, 13 and 14 respectively, and each of the remote receivers 20,25,26 and 27 is associated with one of the remote energy transmitting circuits 30, 35, 36 and 37 respectively.

Consequently, when installing the tire pressure monitoring system on the vehicle 10, it is important that designated inputs and outputs of the controller 60 are coupled to the pair of remote energy transmitting circuits 30, 35, 36 and 37, and associated remote receiver 20,25,26 and 27 at each tire location.

For example, an output and input of the controller 60 may be designated for coupling to a pair of remote transmitting circuits and associated remote receivers, where both the remote transmitting circuits and the associated remote receiver are mounted at the front-left tire location. This predetermined designation is enables the controller 60 to correctly identify the front-left tire of the vehicle is being monitored, and thus, enable the controller 60 to provide an indication to a driver of the vehicle that a pressure detection fault has been detected at the front-left tire when the tire pressure monitoring system detects a fault in that tire.

The energy transmitting circuits 30,35,36 and 37 and the remote receivers 20,25,26 and 27 are coupled to the controller 60 by cabling or wires, however, any means of coupling data and/or power may also be employed.

Figure 2:
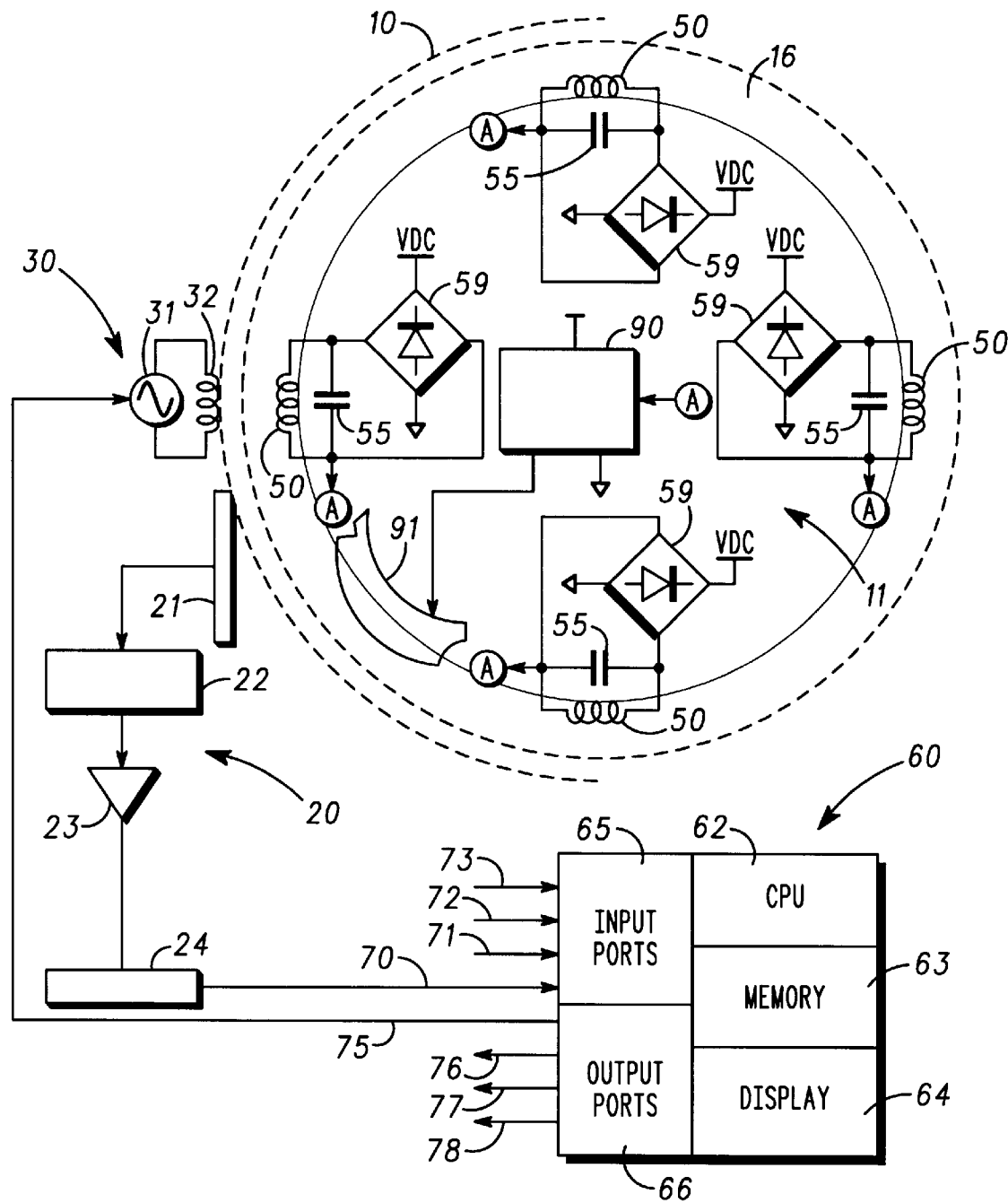
FIG. 2 schematically shows the block/circuit diagram of the tire pressure monitoring system in one tire of the vehicle in FIG. 1.

FIG. 2 shows the energy transmitting circuit 30, the remote unit 11, the remote receiver 20, and the controller 60, operationally coupled, and mounted on the vehicle 10 to monitor the pressure of tire 16. The energy transmitting circuit 30 includes a radio frequency (RF) oscillator 31 having an input coupled to receive an activate signal from an output 75 of the controller 60. The oscillator 31 has an output coupled to an antenna 32. The antenna 32 receives the first RF signal from the oscillator 31 and transmits the first RF signal. The RF antenna 32 is shaped and mounted relative to the tire 16, to optimize the transmission of the first RF signal in the direction of the remote unit 11 in the tire 16. The energy transmitting circuit 30 continues to transmit the first RF signal until the activate signal is terminated by the controller 60.

The remote receiver 20 includes an antenna 21 which is also coupled to an LC tune circuit 22. The antenna 21 receives a second RF signal and provides the second RF signal to the LC tune circuit 22. The LC tune circuit 22 primarily couples the second RF signal to an RF amplifier 23 and effectively attenuates all other RF signals. The RF amplifier 23 amplifies the second RF signal and provides the amplified second RF signal to a demodulator 24. In response to receiving the second RF signal from the RF amplifier 23, the demodulator 24 provides an output signal to an input 70 of the controller 60. The output signal provides an indication to the controller 60 that the second RF signal has been received.

The controller 60 is mounted on board the vehicle 10 and includes a memory 63 for storing data and an executable program, and outputs 75–78, each output being coupled to the Input of a remote energy transmitting circuit 30,35,36,37 respectively. At any time the controller 60 sequentially provides an activate signal from one of the outputs 75–78 to the respective one of the energy transmitting circuits 30,35, 36,37.

The controller 60 also includes an equal number of inputs 70–73 as there are outputs. Each of the inputs 70–73 is associated with one of the outputs 75–78, and is coupled to receive an output signal from one of the of remote receivers 20,25,26,27.

In addition, the controller 60 includes a processor 62, a memory 63, and a display 64. The display 64 has an input coupled to receive data from the processor 62, and displays the received data. The display 64 provides an indication as to the status of the tire pressure of the tires on the vehicle 10 to the driver. The processor 62 is also coupled to the memory 63, the outputs 75–78, and the inputs 70–73.

The processor 62 executes a program stored in the memory 63 which sequentially causes one of the outputs 75–78 to provide the activate signal. The processor 62, then monitors the associated input 70–73 for receipt of the output signal. When after a predetermined time from providing the activate signal the output signal is not received by the processor 62, the processor 62 provides data to the display 64 to indicate that there is a fault with the pressure detection of at least one of the plurality of tires of the vehicle 10. However, when the time between providing the activate signal and receiving the output signal is less than the predetermined time, the processor 62 does not provide any indication to the driver of the vehicle 10.

The remote unit 11 is secured to the rim on which the tire 16 is mounted and includes energy receiving circuits (50, 55,59) and an antenna 91, coupled to a remote unit controller 90. The energy receiving circuits (50,55,59) are mounted along an annular path within the tire 16. Each of the energy receiving circuits (50,55,59) includes an antenna 50 for receiving the first RF signal. The antenna 50 is coupled to provide the first RF signal to a converter 59, such as a bridge rectifier. The converter 59 converts the first RF signal to a direct current voltage (VDC) , and provides the VDC from an output.

The antenna 32 of the energy transmitting circuit 30 and the antennae 50 of the remote unit 11 serves to provide power to the remote unit 11 in the tire 16. This Is accomplished by the energy transmitting circuit 30 transmitting the first RF signal, the remote unit 11 receiving the first RF signal and rectifying the first RF signal to produce the VDC. The VDC forms the power supply to the remote unit controller 90 within the tire 16.

The energy receiving circuits (50,55,59) are located around the rim of the tire 16 to ensure that whatever the position of the energy receiving circuits (50,55,59) relative to the energy transmitting circuit 30, there will always be sufficient power received by the energy receiving circuits (50,55,59) to ensure reliable operation of the remote unit controller 90.

The energy receiving circuits (50,55,59) are located in the tire 16 such that at least one of the energy receiving circuits (50,55,59) will advantageously receive the first RF signal and provide sufficient power to the remote unit controller 90 to ensure reliable operation of the remote unit controller 90 when the vehicle 10 is stationary.

In addition, the energy receiving circuits (50,55,59) each have an output, marked Ⓐ in the drawings, coupled to an input of the remote unit 11. This coupling provides the first RF signal to the remote unit controller 90. The remote controller 90 uses the first RF signal as a clock signal to ensure proper operation of the internal circuitry of the remote unit controller 90, advantageously avoiding the need for a separate clock circuit in the tire, and the additional need to provide power to the separate clock circuit.

Figure 3:
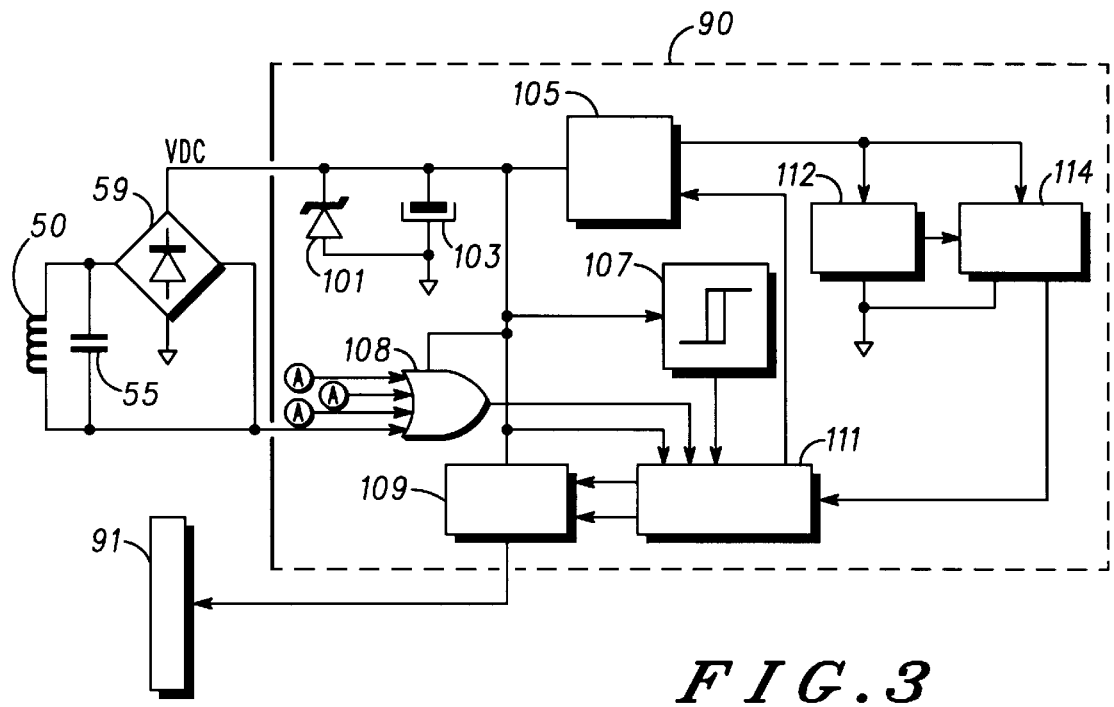
FIG. 3 shows a detailed circuit diagram of a part of the system of FIG. 2.

FIG. 3 shows the remote unit controller 90 which includes a power regulator 105, a hysteresis circuit 107, a pressure sensor circuit 112, a comparator circuit 114, an OR gate 108, a RF transmission circuit 109 and a logic circuit 111.

The power regulator 105 is coupled to receive the VDC from the outputs of the energy receiving circuits (50,55,59), having an input to receive a power enable signal and output to provide a regulated voltage when the power enable signal is received.

The hysteresis circuit 107 has an input coupled to receive the VDC from the outputs of the energy receiving circuits (50,55,59). The hysteresis circuit 107 also has an output for providing a hysteresis high output signal when the VDC is greater than a predetermined high voltage, and provides a hysteresis low output signal from the output when the VDC is less than a predetermined low voltage.

The pressure sensor circuit 112 has an input coupled to receive the regulated voltage from the output of the power regulator 105. The pressure circuit includes a pressure sensor for detecting the pressure in the tire, and generates a pressure signal indicative of the detected pressure. In addition, the pressure sensor circuit 112 has an output for providing the pressure signal.

The pressure sensor circuit 112 requires a regulated power supply and draws a relatively high current when operating to provide reliable pressure detection. In order to ensure reliable pressure detection and conserve power, the switchable power regulator 105 is turned ON only when pressure detection is required.

The comparator circuit 114 is coupled to receive the regulated voltage from the power regulator 105, and the pressure signal from the pressure sensor circuit 112. The comparator 114 compares the pressure signal with a predetermined pressure signal, and provides a pressure high output signal from an output when the pressure signal is greater than the predetermined pressure signal. The comparator also provides a pressure low output signal from the output when the pressure signal is less than the predetermined pressure signal.

The OR gate 108 has a number of inputs, each coupled to the output of one of the of energy receiving circuits (50,55, 59) to receive the first RF-signal from the energy receiving circuits (50,55,59), and to provide the received first RF signal from an output.

The RF transmission circuit 109 is coupled to receive a second RF signal and a transmit enable signal from the logic circuit 111. The RF transmission circuit 109 is coupled to an antenna 91, and provides the second RF signal to the antenna upon receipt of the transmit enable signal. The antenna 91 transmits the second RF signal for as long as the transmit enable signal is provided to the RF transmission circuit 109.

The logic circuit 111 is coupled to receive the voltage from the outputs of the energy receiving circuits (50,55,59), coupled to receive the first RF signal from the output of the OR gate 108, coupled to the outputs of the hysteresis circuit 107 and the comparator circuit 114, coupled to provide the power enable signal to the power regulator 105, coupled to provide the second RF signal and the transmit enable signal to the RF transmission circuit 109.

The logic circuit 111 provides the power enable signal to the power regulator 105 in response to receiving the hysteresis high output signal from the hysteresis circuit 107. The logic circuit 111 also provides the transmit enable signal to the RF transmission circuit 109 in response to receiving the pressure high output signal from the comparator circuit 114.

A Zener diode 101 is coupled to the VDC supply to protect the circuitry in the remote unit controller 90 from over voltage. A capacitor 103 is coupled to the VDC supply to provide storage and filtering of the VDC supply.

Figure 4:
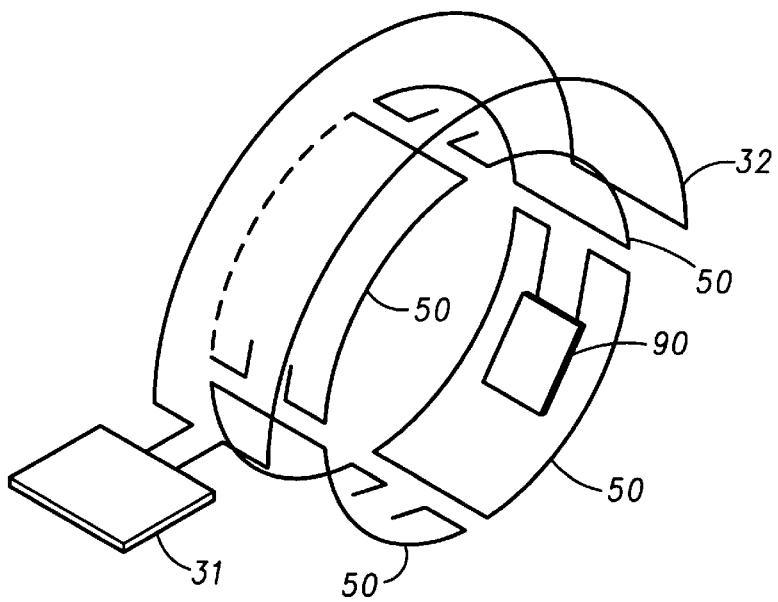
FIG. 4 shows the relative positions of the antennae in one tire and the antenna mounted on the vehicle body.

FIG. 4 shows the relative arrangement and orientation of the energy transmitting circuit 30 including the antenna 32 and the oscillator 31. The energy receiving circuits including the antennae 50 are also included.

Figure 5:
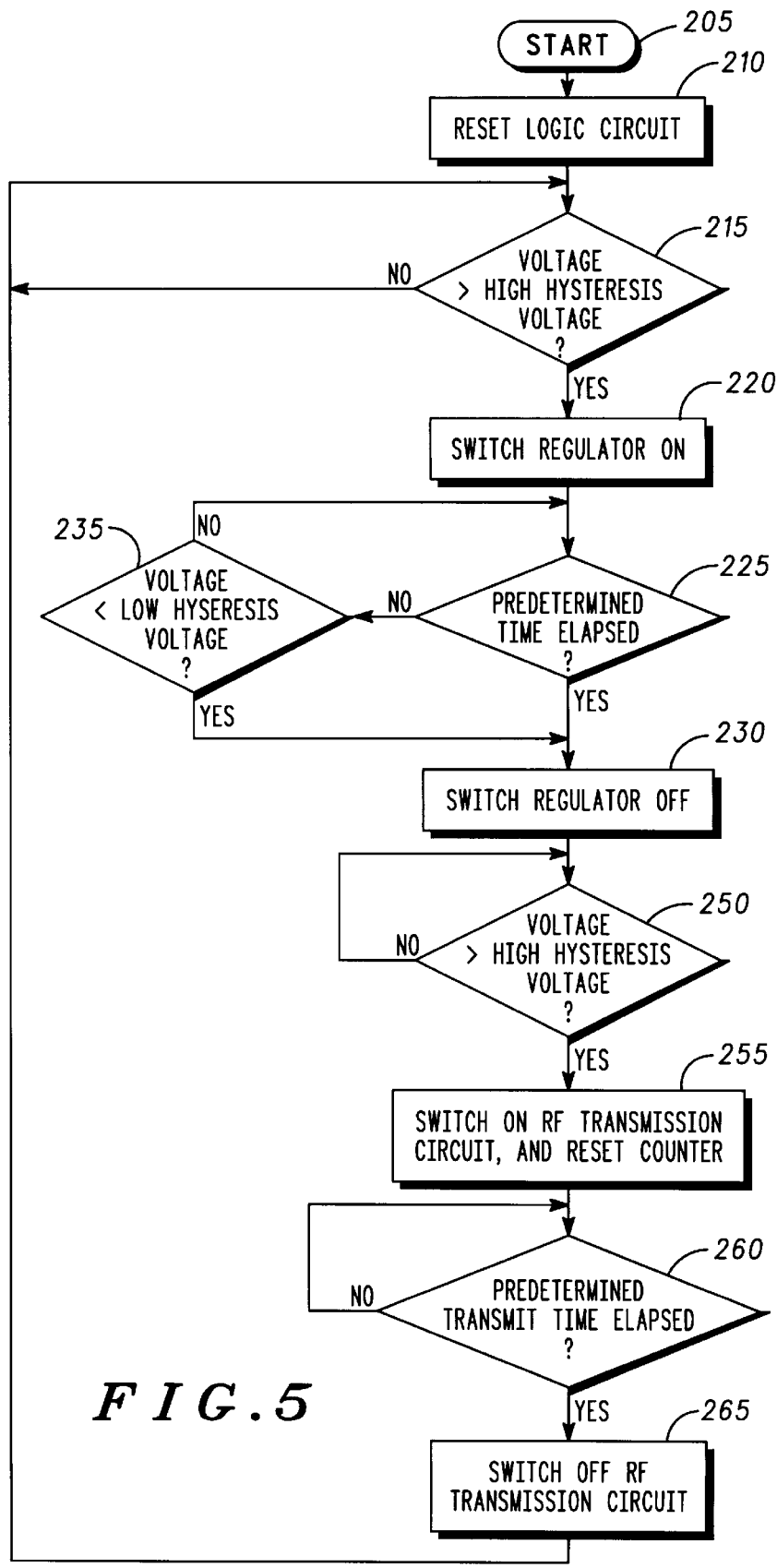
FIG. 5 shows a flowchart detailing the operation of a portion of the tire pressure monitoring system in FIG. 1.

FIG. 5 shows the operation of the remote unit controller 90 in a flowchart. In accordance with an example of energy transmitting circuit 30, the remote unit 11 and the remote receiver 20 associated with the tire 16 on the vehicle 10 will be described. However, it is understood that the steps described will apply equally to the other tires 17,18,19 of the vehicle 10.

In step 205 the car engine is started and the processor 62 sequentially activates one of the energy transmitting circuits 30,35,36 and 37 through outputs 75–78. When the processor provides the activate signal to the energy transmitting circuit 30, the energy transmitting circuit 30 generates the RF signal of 125 kilohertz (Khz). The antenna 32 of the energy transmitting circuit 30 performs a function similar to a primary coil of a transformer.

When the first RF signal is received by one or more of the energy receiving circuits (50,55,59), the antennae of the energy receiving circuits 50 perform a function similar to secondary coils of the transformer.

The capacitor 55 which forms an LC tune circuit can be tuned to ensure that the first RF signal is Induced in the antennae 50 of the energy receiving circuits (50,55,59). The first RF signal induced in the antennae 50 is then rectified by the full bridge rectifiers 59 to produce the VDC, and the VDC is provided to the remote unit controller 90.

In the remote unit controller 90, the VDC charges the capacitor 103 and provides power to other circuitry, such as, the OR gate 108, the RF transmission circuit 109, the hysteresis switch 107, the regulator 105, and the logic circuit (111).

The VDC will fluctuate depending on the strength of the first RF signal induced on the antennae 50 of the energy receiving circuits (50,55,59). When the VDC rises to a value greater than a predetermined power-on-reset level of the logic circuit 111, the logic circuit 11 will reset 210 itself. The power-on-reset-level is a well known feature of logic circuits that ensures that when power is applied to a logic circuit, the logic circuit is reset. Typically, the power-on-reset level is set at approximately 1.5 to 2 volts.

The hysteresis circuit 107 continuously monitors the VDC. When hysteresis circuit 107 determines 215 that the VDC is greater than the predetermined high voltage, the hysteresis circuit 107 provides the hysteresis high output voltage to the logic circuit 111. However, when the hysteresis circuit 107 determines 215 that the VDC is not greater than the predetermined high voltage, the hysteresis high output voltage is not provided.

In response to receiving the hysteresis high output voltage, the logic circuit 111 provides the power enable signal to the power regulator 105 which switches 220 the power regulator 105 ON. The regulated voltage from the power regulator causes the pressure sensor circuit 112 and the comparator 114 to operate. The pressure sensor circuit 112 provides the pressure signal to the comparator 114. The comparator 114 compares the pressure signal with a predetermined pressure signal. The predetermined pressure signal is indicative of the desired pressure for the tire 16 of the vehicle 10. The comparator 114 provides either the pressure high output signal or the pressure low output signal to the logic circuit 111. The logic circuit latches the signal received from the comparator while the power regulator 105 is turned ON. This ensures that only signals produced from the output of the comparator 114 when reliable pressure detection can occur, are latched by the logic circuit 111.

The logic circuit 111 in response to receiving the power enable signal keeps the power regulator 105 turned ON for a predetermined time 225, after which the logic circuit 107 terminates the power enable signal which switches 230 the power regulator 105 OFF. Alternatively, during the time when the power regulator 105 is turned ON, the logic circuit 111 monitors the output of the hysteresis circuit 107. If the logic circuit 111 determines 235 that the hysteresis low output signal is provided by the hysteresis circuit 107, indicating that the VDC has fallen to a value below the predetermined low voltage, the logic circuit 111 terminates the power enable signal which switches 230 the power regulator OFF.

The logic circuit 111 tracks the time using a counter which is clocked by the first RF signal provided to the logic circuit via the OR gate 108. Hence, when the counter counts to a predetermined value the predetermined time has lapsed. The predetermined time the power regulator 105 is switched ON is 200 milliseconds, and is determined by the following equation:

$$T = C * V / I$$

where,

C: capacitor 103 is 220 microfarad.

V: voltage difference between the predetermined high voltage and predetermined low voltage for the operation of the hysteresis circuit 107 is 1 volt.

I: current consumption of the pressure sensor circuit 112 and the comparator 114 is a maximum of 1 milliampere.

At this point of the process, the power regulator 105 is turned OFF and the comparator 114 has provided either a pressure high output signal or the pressure low output signal to the logic circuit 111. When the power regulator 105 is switched OFF, the capacitor 103 will charge up.

Next, the logic circuit 111 monitors the output of the hysteresis circuit 107 for the hysteresis high output signal to determine 250 whether the VDC monitored by the hysteresis circuit 107 is greater than the predetermined high voltage.

When the VDC is lower than the predetermined high voltage the logic circuit continues to monitor the output of the hysteresis circuit 107. However, when the VDC is greater than the predetermined high voltage, the logic circuit 111 resets the counter and provides 255 the transmit enable signal to the RF transmission circuit 109 for a predetermined transmit time as determined by the counter.

When the pressure high output signal is latched from the output of the comparator 114 by the logic circuit 111, no carrier is provided to the RF transmission circuit 109 from the logic circuit 111. Hence, no RF signal is transmitted by the RF transmission circuit 109.

However, when the pressure low output signal is latched from the output of the comparator 114 by the logic circuit 111, a second RF signal and the transmit enable signal are provided to the RF transmission circuit 109 and the second RF signal is transmitted by the antenna 91 coupled to the output of the RF transmission circuit 109 for a predetermined transmit time as determined by the counter.

After the predetermined transmit time has elapsed 260, the logic circuit 111 terminates the transmit enable signal, thereby switching 265 off the RF transmission circuit 109.

The first and second RF signals are amplitude modulated signals. The second RF signal is generated by the counter by dividing the first RF signal by an integer, as can be accomplished using a logic circuit.

The tire pressure monitoring system will cycle between turning ON the power regulator 105 to perform the pressure detection, and turning ON the RF transmission circuit to transmit the status of the detected tire pressure.

Thus, the tire pressure monitoring system of the preferred embodiment of the invention utilizes a controller coupled to remote energy transmitting circuits and remote receivers to activate a remote unit in each tire sequentially. As one pair of a remote energy transmitting circuit and a remote receiver is dedicated to each tire, and only the dedicated pair is activated at any one time, the use of complex circuitry in the tires for identification is advantageously avoided. Consequently, as there is no need for complex circuitry the present invention provides a simpler and more economical tire pressure monitoring system.

In addition, the use of multiple energy receiving circuits in the tires allows the pressure monitoring system to operate reliably irrespective of the position of the tire, particularly when a vehicle is stationary.

Hence, there is provided a tire pressure monitoring system that overcomes or at least alleviates the problems of the prior art.

We claim:

1. A tire pressure monitoring system for a vehicle having a plurality of tires, the tire pressure monitoring system comprising:

a plurality of remote units each unit being for mounting within each of the plurality of tires for receiving a first radio frequency (RF) signal, for detecting the pressure in the tire, and for transmitting a second RF signal, different from the first RF signal, when the detected pressure is greater than a predetermined pressure;

a corresponding plurality of remote energy transmitting circuits for mounting on the vehicle, each remote energy transmitting circuit being associated with one of the plurality of remote units and having an input for receiving an activate signal, and an antenna for transmitting the first RF signal in response to the receipt of the activate signal;

a corresponding plurality of remote receivers for mounting on the vehicle, each remote receiver being associated with one of plurality of remote energy transmitting units having an antenna for receiving the second RF signal, and an output for providing an output signal when the second RF signal is received; and a controller for mounting on the vehicle, for coupling to the input of each of the remote energy transmitting circuits and for coupling to the output of each of the remote receivers, the controller being arranged for sequentially transmitting the activate signal to each of the remote energy transmitting circuits, and determining whether the output signal is received from each of the remote receivers before a predetermined time expires, wherein when the output signal is not received from one of the remote receivers after the predetermined time expires, the controller produces a signal indicating that there is a fault with the pressure detection of at least one of the plurality of tires.

2. A tire monitoring system according to claim 1 wherein each remote unit comprises:

a plurality of energy receiving circuits for mounting along an annular path within the tire, each having an antenna for receiving the first RF signal, a converter for converting the first RF signal to a voltage, and an output for providing the voltage;

a power regulating means coupled to receive the voltage from the outputs of the plurality of energy receiving circuits, coupled to receive a power enable signal and coupled to provide a regulated voltage when the power enable signal is received;

a hysteresis circuit coupled to receive the voltage from the outputs of the plurality of energy receiving circuits, having an output for providing a hysteresis high output signal when the voltage from the outputs of the plurality of energy receiving circuits is greater than a predetermined high voltage, and for providing a hysteresis low output signal when the voltage from the outputs of the plurality of energy receiving circuits is less than a predetermined low voltage;

a pressure sensor circuit coupled to receive the regulated voltage from the output of the power regulating means, having a pressure sensor for detecting the pressure and for generating a pressure signal indicative of the detected pressure, and an output for providing the pressure signal;

a comparator circuit coupled to receive the regulated voltage and the pressure signal from the pressure sensor circuit, having a comparator for comparing the pressure signal with a predetermined pressure signal, and an output for providing a pressure high output signal when the pressure signal is greater than the predetermined pressure signal, and for providing a pressure low output signal when the pressure signal is less than the predetermined pressure signal;

a coupling means having a corresponding plurality of inputs, each input coupled to the output of one of the plurality of energy receiving circuits for receiving the first RF signal from at least one of the plurality of energy receiving circuits, and having an output for providing the received first RF signal;

an RF transmission circuit coupled to receive the second RF signal and a transmit enable signal from the logic circuit, and having an antenna for transmitting the second RF signal upon receipt of the transmit enable signal; and a logic circuit coupled to receive the voltage from the outputs of the plurality of energy receiving circuits, coupled to receive the first RF signal from the output of the coupling means, coupled to the outputs of the hysteresis circuit and the comparator circuit, coupled to provide the power enable signal to the power regulating means, coupled to provide the second RF signal and a transmit enable signal, wherein the logic circuit provides the power enable signal in response to receiving the hysteresis high output signal from the hysteresis circuit, and wherein the logic circuit provides the transmit enable signal in response to receiving the pressure high output signal from the comparator circuit.

3. A tire pressure monitoring system according to claim 1 wherein the controller comprises:

a memory for storing data and an executable program;

a plurality of outputs, each output coupled to the input of one of the plurality of remote energy transmitting circuits for providing the activate signal thereto;

a plurality of inputs, each input coupled to an output of one of the plurality of remote receivers to receive the output signal therefrom;

a display having an input coupled to receive data and, for displaying the received data; and a processor coupled to the memory, the plurality of outputs, the plurality of inputs, and the input of the display, the processor being arranged for executing the program in the memory to sequentially cause the one of the plurality of inputs to provide the activate signal, to monitor the plurality of inputs for receipt of the output signal, and when the output signal is not received after the predetermined time from providing the activate signal, providing data to the display to indicate that there is a fault with the pressure detection of at least one of the plurality of tires.

4. A tire pressure monitoring system according to claim 1 wherein each remote receiver comprises:

a frequency selective circuit having an input for coupling to the antenna, and an output, the frequency selective circuit being arranged for primarily coupling the second RF signal from the input to the output;

a RF amplifier coupled to receive the second RF signal from the output of the frequency selective circuit and coupled to provide an amplified second RF signal; and a demodulator coupled to receive the amplified second RF signal from the RF amplifier, demodulate the amplified second RF signal to produce the output signal, and coupled to provide the output signal.

5. A tire pressure monitoring system according to claim 1 wherein each remote energy transmitting circuit comprises:

a RF signal generator coupled to the input for receiving the activate signal, for generating the first RF signal in response to receiving the activate signal, and coupled to the antenna for providing the first RF signal thereto.

6. A tire pressure monitoring system according to claim 2 wherein the converter comprises a bridge rectifier.

7. A tire pressure monitoring system according to claim 2 wherein the coupling means comprises an OR logic gate.

* * * * *